Patented Aug. 31, 1954

2,687,968

UNITED STATES PATENT OFFICE 2,687,968

REFLEX-REFLECTOR LENS ELEMENTS

Warren R. Beck, Mahtomedi, Minn., assignor to Minnesota Mining & Manufacturing Company, St. Paul, Minn., a corporation of Delaware No Drawing. Application July 26, 1950, Serial No. 176,057

2 Claims. (Cl. 106—53)

This invention relates to small glass beads or spherides suitable for incorporation into highway striping paints as reflex-reflective lens elements.

Painted highway centerlines and cross-walks have been made strikingly visible to nighttime motorists by the inclusion in the paint layer of small transparent glass beads or sphericles. These tiny particles, in conjunction with the reflective pigment of the paint, act to reflect the incident light from the headlights back toward its source and thus to make the painted area visible to the motorist.

To be effective for such use, the beads must have certain properties. They must, for example, be and remain transparent. Consequently they must be resistant to weathering, including clouding or pitting of the surface, leaching of soluble components, and other changes induced by chemical action, as well as discoloration induced by exposure to sunlight. The beads must have high mechanical strength so that they will not be crushed or broken by traffic. A high refractive index of at least about 1.6 is desirable in providing substantially increased reflex-reflectivity as compared with the more usual beads having a refractive index of 1.50–1.55. The beads must be substantially spherical, in order to provide the desired reflex-reflection. In addition, beads for highway striping and similar large-volume applications should be inexpensive.

It is therefore an object of this invention to provide reflex-reflector lens elements in the form of glass beads or sphericles suitable for the reflectorizing of highway centerline stripes and the like. A further object is to provide glass beads for such use and which may be economically produced both as to composition and manufacture.

Soda-lime-silica type glasses are relatively low in compositional cost, but have a rather high melting temperature and an extended high-viscosity range; that is, the melt does not rapidly increase in fluidity on heating to higher temperatures. Lowering of the melting temperature is obviously desirable as a means of lowering the fuel cost. Lower temperatures are also desirable in reducing the corrosion of refractories employed in the furnace. The cost of the glass is thus reduced. Increasing the fluidity of the melt at temperatures above the melting temperature is also desirable in facilitating the formation of spherical particles. However, all prior attempts to secure lower melting temperatures and increased fluidity of the melt in soda-lime-silica type glass have at the same time reduced the chemical and mechanical durability of the glass, to an extent such that the product was no longer fully adaptable to the production of beads for highway striping.

I have now discovered that certain complex compositions based on a low-silica soda-lime-silica formula which fall within certain specified limits as hereinafter defined, and which would ordinarily not be considered capable of forming transparent glass articles, can surprisingly be formed into small transparent glass beads or sphericles. These compositions are desirably low-melting and have a low viscosity when heated to the melting temperature while at the same time being fully satisfactory, in the form of small beads or sphericles, in chemical and mechanical strength.

These new compositions melt readily at about 1300–1350° C. Within this temperature range the glass is so fluid that it will not string out when a portion is lifted from the melt. Ordinary glasses when in their melting range or even considerably above such range are much too viscous to behave in this manner.

On slow cooling the glass devitrifies completely, but I have found that it may be rapidly cooled or quenched from the liquid state to produce transparent particles. Liquid droplets, formed, for example, by passing crushed and graded particles of the glass through a flame or a radiant-heat stack, may be quenched in air to provide spherical transparent beads. The droplets rapidly assume the spherical shape during free fall because of the high fluidity of the melted glass, and prolonged heating at high temperatures is therefore unnecessary.

EXAMPLE 1

One glass which has given exceptionally good results in the form of small glass beads or sphericles when tested in painted highway centerline stripes under actual use conditions has the following composition as calculated from the batch raw materials, the proportions being given in parts by weight:

| | |
|---|---|
| $SiO_2$ | 22.9 |
| $Al_2O_3$ | 17.2 |
| $MgO$ | 11.3 |
| $CaO$ | 13.7 |
| $BaO$ | 9.1 |
| $B_2O_3$ | 9.0 |
| $P_2O_5$ | 4.4 |
| $Na_2O$ | 6.4 |
| $ZrO_2$ | 2.5 |
| $CaF_2$ | 3.5 |

Irregular particles of glass having the above composition, when freely suspended in air and heated to about 1300° C., rapidly became spherical and when rapidly chilled in air were recovered as clear, colorless, transparent beads or sphericles having a refractive index ($n_D$) of 1.60. The beads were extremely durable both in accelerated chemical tests and under outdoor weathering conditions, and were highly resistant to breakage. A highway centerline of such beads in paint was brilliantly reflex-reflective and retained its brilliance for a long time under traffic.

EXAMPLE 2

Another and less complex composition which has given good results is as follows:

| | |
|---|---|
| $SiO_2$ | 26 |
| $Al_2O_3$ | 18 |
| MgO | 15 |
| CaO | 19 |
| $B_2O_3$ | 11 |
| $Na_2O$ | 7 |
| $CaF_2$ | 4 |

Clear, transparent, chemically and mechanically durable, and optically effective beads were readily produced from this glass composition, which contains all significant compositional components and in preferred proportions.

While the proportions of these significant compositional components may be varied somewhat, the range within which the desired properties are to be obtained is not great, as will be apparent from the following table, based on the results of tests made on a large number of compositions.

Table I

COMPOSITIONAL LIMITS IN WEIGHT PERCENT

| | |
|---|---|
| $SiO_2$ | 20–30 |
| $Al_2O_3$ | 13–23 |
| MgO | 5–16 |
| CaO | 12–24 |
| $B_2O_3$ | 5–13 |
| $Na_2O$ | 4–10 |
| $F_2$ | 0– 3 |

Certain other relationships between various of these components must also be observed. The total of $B_2O_3$, $Na_2O$ and $F_2$ must be about 10–24 percent. Where the total of $SiO_2$ and $Al_2O_3$ is about 40 percent or more, the total of $Na_2O$ and $F_2$ must be at least about one-tenth of that value.

As is common practice in glass technology, the above formulas are given principally in terms of oxides of the elements, the single exception being fluorine which may be given in terms either of the element or of calcium fluoride. Where the fluoride is specified, this component could equally accurately be included in terms of fluorine and calcium oxide; or some other fluoride, e. g. $MgF_2$, could be substituted, the amount of MgO then being corrected to compensate.

It will be observed that Example 2 and the Table II each list only seven such components, including fluorine which in some cases may be omitted, whereas ten (including the seven of Example 2) are listed under Example 1. Similarly, a number of other components, including the three additional components of Example 1, may be incorporated in my novel glass formulas in partial substitution of various of the fundamentals materials. The added components in many cases improve certain properties of the resulting glass beads, and the increased compositional complexity of the formula is found to be desirable in improving the fluidity of the melt. For example, the oxides of zinc, lead, titanium, zirconium, and barium are effective in increasing the refractive index of the beads. The mechanical strength, e. g. as measured by the resistance of the beads to crushing, is improved by the addition of small amounts of lithium and beryllium oxides. Chemical resistance is improved by the addition of zinc, titanium, and zirconium oxides. On the other hand, mechanical strength is reduced by addition of barium, strontium, lead, or potassium oxides in other than small amounts. Lead and potassium oxides also decrease the chemical resistance of the beads. Other materials may be added, either to improve specific properties or as incidental components of available raw materials, without departing from the invention.

These various components may be added to the glass batch in any of several different forms, the components and proportions as listed in the examples being derived by calculation from typical raw-materials batches such as the following:

Table II

TYPICAL RAW-MATERIALS FORMULAS TO MAKE COMPOSITION OF EXAMPLE 1

| | | |
|---|---|---|
| silica | 14.9 | 17.5 |
| aluminum hydrate | 18.6 | 21.9 |
| raw dolomite | 31.3 | |
| calcined dolomite | | 19.0 |
| soda ash | 2.5 | 3.7 |
| fluorspar | 2.5 | 2.9 |
| barium carbonate | 8.2 | 9.7 |
| boric acid | 11.2 | 13.2 |
| magnesia | 1.6 | 1.9 |
| disodium phosphate | 6.2 | 7.3 |
| sodium zirconium silicate | 3.2 | |
| zircon | | 3.3 |

Other raw materials and combinations may equally well be employed in compounding this and other specific formulas coming within the scope of the invention, as will be readily appreciated by those skilled in the art. Sodium fluoride, for example, may serve as a source of fluorine and sodium; sodium nitrate may be used in place of soda ash; borax may replace an equivalent amount of boric acid and soda ash; kaolin, if sufficiently free of impurities, may be used as a source of both silica and alumina.

In general, raw materials are selected which are substantially free of color-imparting impurities, particularly iron, thus making unnecessary the addition of known chemical decolorizers, e. g. antimony or arsenic oxides.

As previously indicated, transparent small glass beads or sphericles may be produced from the compositions hereinabove described by suspending small particles of the glass in air at a moderately high temperature for a brief time and then quickly cooling. Where much larger masses would unavoidably either crack or devitrify, particles up to about 35 mils in diameter are successfully produced by such methods in the form of clear, transparent, colorless, weather-resistant and traffic-resisting beads or sphericles. This diameter represents a bead size well suited for reflectorizing of painted highway centerlines.

Having described various embodiments of my invention for purposes of illustration, but without intent to be limited thereto, what I claim is as follows:

1. Clear, transparent, substantially colorless, weather-resistant, strong and tough small glass beads or sphericles having a refractive index of about 1.6 and suitable for incorporation as reflex-reflective lens elements in painted highway centerlines, and having a composition in percent by weight, as calculated from the batch, essentially as follows:

| | |
|---|---|
| $SiO_2$ | about 22.9 |
| $Al_2O_3$ | about 17.2 |
| MgO | about 11.3 |
| CaO | about 13.7 |
| BaO | about 9.1 |
| $B_2O_3$ | about 9.0 |
| $P_2O_5$ | about 4.4 |
| $Na_2O$ | about 6.4 |
| $ZrO_2$ | about 2.5 |
| $CaF_2$ | about 3.5 |

2. Clear, transparent, substantially colorless, weather-resistant, strong and tough small glass beads or sphericles having a refractive index of about 1.6 and suitable for incorporation as reflex-reflective lens elements in painted highway centerlines, and having a composition in percent by weight, as calculated from the batch, essentially as follows:

| | |
|---|---|
| $SiO_2$ | 20–30 |
| $Al_2O_3$ | 13–23 |
| MgO | 5–16 |
| CaO | 12–24 |
| $B_2O_3$ | 5–13 |
| $Na_2O$ | 4–10 |
| $F_2$ | not over about 3 |
| Other components | not over about 20 | said composition totaling substantially 100 percent; wherein the total of $Na_2O$, $F_2$, and $B_2O_3$ is about 10–24; subject to the further condition that the total of $Na_2O$ and $F_2$ must be at least equal to about one-tenth of the total of $SiO_2$ and $Al_2O_3$ when the total of $SiO_2$ and $Al_2O_3$ is at least about 40 percent of the glass composition; said other components consisting of at least one of the oxides ZnO, PbO, $ZrO_2$, BaO, SrO, $Li_2O$, and $P_2O_5$.

References Cited in the file of this patent

UNITED STATES PATENTS

| Number | Name | Date |
|---|---|---|
| 2,010,836 | Adams et al. | Aug. 13, 1935 |
| 2,610,922 | Beck | Sept. 16, 1952 |